Oct. 31, 1972   H. P. ECK   3,701,571

BEARING ASSEMBLY

Filed May 28, 1971

INVENTOR
HERBERT P. ECK
BY *Harry N. Schofer*
ATTORNEY

United States Patent Office 3,701,571
Patented Oct. 31, 1972

3,701,571
BEARING ASSEMBLY
Herbert Percival Eck, 517 26th St.,
West Palm Beach, Fla. 33480
Filed May 28, 1971, Ser. No. 147,857
Int. Cl. F16c 17/10
U.S. Cl. 308—18                                                    8 Claims

ABSTRACT OF THE DISCLOSURE

A bearing assembly in which opposite cheek plates include shafts having tapered bearing surfaces in sliding contact with tapered bearing surfaces on a roller. Annular recesses in the cheek plates compensate for wear of the bearing surfaces.

BACKGROUND OF THE INVENTION

This invention relates to bearings, and more particularly to a bearing construction having a number of novel constructional features.

While not limited thereto, this invention finds especial application in the field of fishing rods, where the fishing line passes over several guides mounted on the rod.

DESCRIPTION OF THE PRIOR ART

Many fishing rod guides have rollers to permit the fishing line to readily travel through the guides. These rollers are small, and use conventional bearing means to reduce costs in manufacture.

Such guides frequently fail, especially under adverse conditions. The fishing line, which becomes wet, deposits considerable water in the guide, thus maintaining the guide and roller in a wetted condition. In the case of salt water fishing, the water deposited on the guide, roller and bearing causes severe corrosion and pitting, and the evaporation of the salt water leaves a residue which collects in the roller and on bearing surfaces, rapidly increasing frictional resistance in sliding parts and soon results in an inoperative roller.

SUMMARY OF THE INVENTION

It is an object of this invention to provide a novel bearing assembly which obviates the above objectionable features.

It is further object to provide a novel bearing assembly having bearing surfaces which present sliding surfaces against both transverse and axial thrusts.

It is a still further object to provide a novel bearing assembly having bearing surfaces which tend to repel the collection of water thereon.

It is a still further object to provide a novel bearing assembly which is easily modified to compensate for bearing surface wear.

It is a still further object to provide a novel bearing assembly which uses cheap materials, is economical to manufacture, and has a long useful and efficient operating life.

The attainment of the above objects, as well as additional objects and advantages, is accomplished by a novel construction in which a pair of cheek plates are provided with central shaft projections having tapered bearing surfaces. At least one of said projections includes an axial extension from the tapered bearing surface, which extension contacts with the other cheek plate or shaft to properly position the two tapered surfaces in fixed spaced relationship. A roller having a central, axial, bore is rotatable with sliding contact on the tapered bearing surfaces. Each end of the axial bore is tapered to fit and slide on the tapered bearing surfaces of the shaft projections. The diameter of the axial bore in the roller is greater than the maximum cross dimension of the axial extension to prevent any contact between the axial extension and the wall of the axial bore in the roller.

BRIEF DESCRIPTION OF THE DRAWING

In order to gain a clear understanding of the construction and operation of the invention, reference is made to the following detailed description of a preferred embodiment and to the annexed drawings, in which.

DESCRIPTION OF A PREFERRED EMBODIMENT

Figure 1:
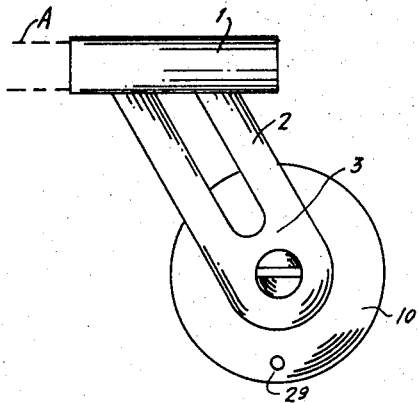
FIG. 1 is an elevation view of my novel bearing assembly in association with a fishing rod, roller and socket tip assembly.

For a more detailed description of the construction and operation of the invention, reference is made to the annexed drawings illustrating a preferred embodiment, in which the same reference numerals designate the same elements throughout the several views.

FIG. 1 illustrates a first use of my novel invention in association with a fishing rod roller in a tip assembly having a socket 1 adapted to fit over the end of a fishing rod A. A pair of spaced lateral extensions 2 are integrally connected with the socket 1, the outer ends of which form junctures 3 serving as supports for a bearing assembly 10.

Figure 2:
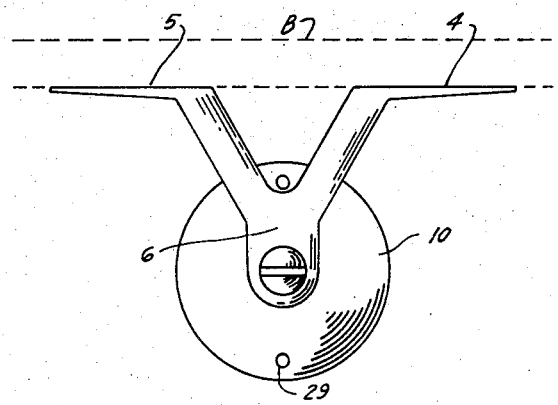
FIG. 2 is an elevation view of my novel bearing assembly in association with a fishing rod guide assembly.
Figure 3:
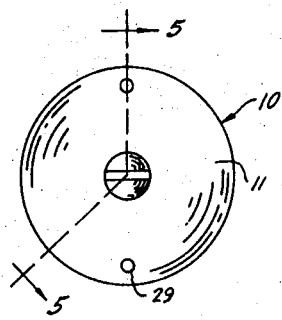
FIG. 3 is an elevation view of my novel bearing assembly adapted for use with a fishing line roller and guide.
Figure 4:
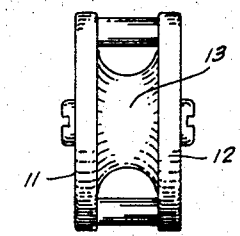
FIG. 4 is an end view of the assembly of FIG. 3.

A second use is illustrated in FIG. 2 in association with a fishing rod guide assembly having pairs of opposed arms adapted for attachment intermediate the ends of a fishing rod B in a manner well known in the art. The arms 5 extend angularly downward forming junctures 6 for attachment to opposite sides of a bearing assembly 10.

Referring to FIGS. 3, 4, 5 and 6, the bearing assembly 10 includes a pair of cheek plates 11 and 12, and a rotating member 13, shown in the form of a pulley or roller.

The cheek plate 11 includes an annular recess 14 defining a peripheral flange 15, and is formed integrally with a shaft comprising a first central axial projection 16, a tapered circular bearing surface 17 and a second axial projection 18. The bearing surface 17 tapers from a larger diameter adjacent the first projection 16 to a smaller diameter adjacent the second projection 18. A coaxial bore 19 passes through the cheek plate 11, projection 16, bearing surface 17, and second projection 18. The cheek plate 11 also includes a pair of diametrically opposed bores 20 for a purpose to be explained later.

The cheek plate 12 is similarly constructed to include an annular recess 21 defining a peripheral flange 22 and is integrally formed with a shaft comprising a first central axial projection 23, a circular tapered bearing surface 24, and a second axial projection 25. The bearing surface 24 tapers from a larger diameter adjacent the first projection 23 to a smaller diameter adjacent the second projection 25. A threaded bore 26 extends coaxially through the cheek plate 12, first projection 23, tapered bearing surface 24 and second projection 25, for a purpose to be explained later. The cheek plate 12 also includes a pair of diametrically opposed bores 32 for a purpose to be set forth later in this specification.

The rotating member 13, shown in the form of a pulley or roller, is provided with a central, axial, bore 27, the opposite outer ends being tapered to a larger diameter away from the center, to form a pair of bearing surfaces 28. The taper of the bearing surfaces 28 is the same as the taper of the bearing surfaces 17 and 24 on which the bearing surfaces 28 are adapted to rotate with sliding contact, as shown in FIG. 5.

It is to be noted that the diameter of the bore 27 is greater than the maximum diameters of the projections 18 and 25, so there is no physical contact between the rotating member 13 and the projections 18 and 25 during operation.

Figure 5:
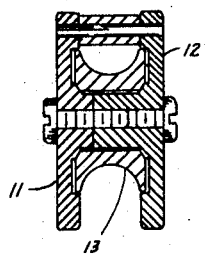
FIG. 5 is a sectional view through my novel bearing assembly, taken on the line 5—5 of FIG. 3.

A pair of shafts 29 are received in the bores 20 in the cheek plate 11 and the bores 32 in the cheek plate 12, as shown in FIG. 5. Rollers 30 are rotatable on the shafts 29. The shafts 29 may be secured within one or both bores 20 and 32 in any manner known in the art to prevent axial movement thereof.

Figure 6:
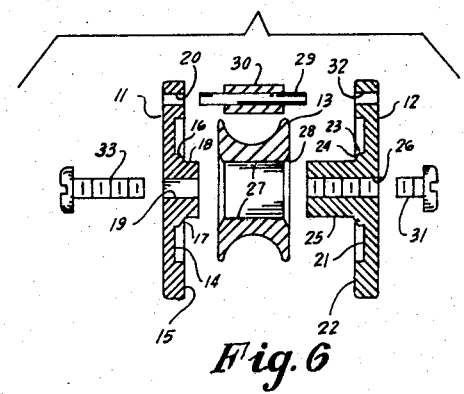
FIG. 6 is an exploded view of FIG. 5, illustrating the various parts more clearly and their relationships.

In assembly, the various elements are brought into proper relationship in the manner illustrated in FIG. 6. It should be noted that, when the outer ends of the second projections 18 and 25 are brought into abutting relation, the tapered bearing surfaces 17, 24 and 28 are properly positioned to assure free rotational sliding contact between such surfaces without any lateral or transverse play, as clearly illustrated in FIG. 5. Also, as shown in FIG. 5, in such position the outer ends of the rotating member 13 are received within the annular recesses 14 and 21 with a small clearance space between the outer ends of the member 13 and the bottoms of the annular recesses. The periphery of the outer ends of the rotating member 13 moves freely within the inner surfaces of the peripheral flanges 15 and 22 and out of contact therewith.

A screw 33 passes through the axial bore 19 in the cheek plate 11 and into the threaded bore 26 in the cheek plate 12 to maintain the parts in assembled relation as clearly shown in FIG. 5. In this construction the shafts projecting from the cheek plates 11 and 12 form an axle structure for the rotating member 13.

A screw 31 passes through bores in the junctures 3 or 6 of FIG. 1 or 2 to attach the bearing assembly 10 to the assemblies shown therein. The screw 31 can pass through bores in the other junctures (described above but not shown) in FIG. 1 or 2.

In the event of bearing wear between the surfaces 17, 24 and 28, endwise adjustment to take up the wear can easily be performed by grinding or filing away the outer ends of the second projection 18 and/or 25, permitting the cheek plates 11 and 12 and the tapered bearing surfaces 17 and 24 to more closely approach each other, the annular recesses 14 and 21 providing the necessary space to accommodate the outer ends of the rotating member 13 within the cheek plates.

In operation, the fishing line would extend through the space between the rotating member 13 and one of the rollers 30. Any water deposited by the wet fishing line would have a tendency to enter the annular recesses 14 and 21, and collect between the bearing surfaces. Because of the taper of the bearing surfaces, the rapid spinning of the rotating member 13 and the radial component of the tapered surfaces 28, as well as the radial surfaces on the outer ends of the rotating member 13, would produce a centrifugal force effectively expelling any water that may pass into the annular recesses 14 and 21.

While, in the arrangement illustrated, the second projection 25 on the cheek plate 12 is shown as being longer than the second projection 18 on the cheek plate 11, it is evident that the two second projections may be made the same length, or the projection 18 made longer than the projection 25, or that one of the projections 18 or 25 be omitted and the other projection be made longer to engage the opposed cheek plate. It is also evident that the bore 19 could be threaded and the bore 26 be left smooth, or that both bores 19 and 26 be made smooth and a bolt and nut construction be used to maintain the parts in assembled relation, in an obvious manner.

While, in the above detailed description, the invention has been shown in association with a fishing rod tip assembly and with a fishing line roller and guide, it is evident that the novel bearing guide assembly is not so limited, but finds application in other fields and with other types of rollers. While in the above description the cheek plates 11 and 12 are fixed and the member 13 is rotatable, it is evident that the member 13 may be held fixed and the cheek plates allowed to rotate, or the cheek plates on the one hand, and the member 13 on the other hand, may be mounted for rotation in opposite directions in an obvious manner.

I claim:

1. A bearing assembly, comprising: an axle structure including a pair of shafts, each shaft having a tapered bearing surface; a rotatable member having diametrically opposed tapered bearing surfaces; and means maintaining said pair of shafts in spaced relation with the bearing surfaces thereof axially aligned and with the tapered bearing surfaces of said rotatable member slidably rotating on the bearing surfaces of said pair of shafts.

2. A bearing assembly as defined in claim 1, including means maintaining said assembly in assembled relation.

3. A bearing assembly as defined in claim 2, in which said means maintaining said assembly in assembled relation includes threaded means engaging said pair of shafts.

4. A bearing assembly as defined in claim 1, in which at least one of said shafts includes a projection forming an extension coaxially thereof, said rotatable member having an axial circular bore, the diameter of said bore being greater than the maximum cross dimension of said extension and not greater than the minimum diameter of the tapered bearing surfaces in said rotatable member, said extension extending into said circular bore.

5. A bearing assembly as defined in claim 4, in which said extension engages said other shaft to maintain said pair of shafts in spaced relation.

6. A bearing assembly as defined in claim 5, in which both of said shafts include projections forming coaxial extensions, and in which the coaxial extensions engage each other to maintain said pair of members in spaced relation.

7. A bearing assembly as defined in claim 1, in which each of said pair of shafts includes a cheek plate supporting the shafts, and each cheek plate having an annular recess concentrically of the shaft thereon to receive said rotatable member to compensate for wear of said bearing surface.

8. A bearing assembly as defined in claim 7, in which said rotatable member includes a peripheral channel defining a pulley, at least one shaft interconnecting said cheek plates, and a roller mounted on said shaft intermediate said cheek plates.

References Cited

UNITED STATES PATENTS

| | | | |
|---|---|---|---|
| 729,656 | 6/1903 | Penprase | 308—18 |
| 1,892,845 | 1/1933 | McGrath | 308—18 |
| 1,047,993 | 12/1912 | Schmid | 308—163 |
| 1,900,672 | 3/1933 | Uhl | 16—18 R |
| 2,262,300 | 11/1941 | Reynolds | 308—18 |

MILTON KAUFMAN, Primary Examiner

B. GROSSMAN, Assistant Examiner